US012703785B2

(12) United States Patent
Schilling, III et al.

(10) Patent No.: US 12,703,785 B2
(45) Date of Patent: Aug. 11, 2026

(54) 2-ETHYLHEXYL METHYL TEREPHTHALATE AND BIS(2-ETHYLHEXYL) TEREPHTHALATE BLEND PLASTICIZERS

(71) Applicant: Eastman Chemical Company, Kingsport, TN (US)

(72) Inventors: Curtis Louis Schilling, III, Kingsort, TN (US); Gary D. Griffith, Jonesborough, TN (US); Joseph Alexander DeLoach, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 508 days.

(21) Appl. No.: 18/005,698

(22) PCT Filed: Jul. 13, 2021

(86) PCT No.: PCT/US2021/041352

§ 371 (c)(1),
(2) Date: Jan. 17, 2023

(87) PCT Pub. No.: WO2022/020133

PCT Pub. Date: Jan. 27, 2022

(65) Prior Publication Data

US 2023/0287198 A1 Sep. 14, 2023

Related U.S. Application Data

(60) Provisional application No. 62/705,927, filed on Jul. 23, 2020.

(51) Int. Cl.
*C08K 5/12* (2006.01)
*C08L 27/06* (2006.01)

(52) U.S. Cl.
CPC ................ *C08K 5/12* (2013.01); *C08L 27/06* (2013.01); *C08K 2201/014* (2013.01)

(58) Field of Classification Search
CPC ........................................................ C08K 5/12
See application file for complete search history.

(56) References Cited

U.S. PATENT DOCUMENTS

| | | | |
|---|---|---|---|
| 5,532,495 | A | 7/1996 | Bloomquist et al. |
| 7,799,942 | B2 | 9/2010 | Osborne et al. |
| 8,372,912 | B2 | 2/2013 | Olsen et al. |
| 9,388,293 | B2 | 7/2016 | Olsen et al. |
| 9,670,128 | B2 | 6/2017 | Storzum et al. |
| 9,776,949 | B2 | 10/2017 | Kaller et al. |
| 10,106,486 | B2 | 10/2018 | Kaller et al. |
| 2002/0028963 | A1 | 3/2002 | Gubisch et al. |
| 2011/0308730 | A1 | 12/2011 | Walther et al. |
| 2013/0137789 | A1 | 5/2013 | Olsen |

FOREIGN PATENT DOCUMENTS

| | | | |
|---|---|---|---|
| JP | 60004151 | A | 1/1985 |
| JP | 2001031794 | A | 2/2001 |
| RU | 2015 156846 | A | 7/2017 |
| RU | 2633963 | C2 * | 10/2017 |
| WO | WO 2011 161037 | A1 | 12/2011 |
| WO | WO 2016 055572 | A1 | 4/2016 |

OTHER PUBLICATIONS

Kolesnik et al. (RU 2633963) English machine translation (Year: 2017).*

Notification of Transmittal of the International Search Report and the Written Opinion of the International Searching Authority, or the Declaration date of mailing Oct. 25, 2021 received in International Application No. PCT/US2021/041351.

Notification of Transmittal of the International Search Report and the Written Opinion of the International Searching Authority, or the Declaration date of mailing Oct. 29, 2021 received in International Application No. PCT/US2021/041352.

Eastman Chemical Company; Safety Data Sheet for Eastman 168™ non-phthalate plasticizer; Revision Date May 30, 2019; 11 pages.

* cited by examiner

*Primary Examiner* — Michael F Pepitone

(74) *Attorney, Agent, or Firm* — Dennis V. Carmen

(57) ABSTRACT

The invention provides a plasticizer for use in plastic materials such as polyvinyl chloride. The plasticizer is a blend of di-(2-ethylhexyl) terephthalate (DOTP) and 2-ethylhexyl methyl terephthalate (MOTP). The blend of di-(2-ethylhexyl) terephthalate and 2-ethylhexyl methyl terephthalate provides a non-ortho-phthalate alternative to plasticizers such as diisononyl phthalate and also produces good fusion temperature, gelation point, plastisol viscosity, efficiency, plasticizer compatibility, and drying time performance.

4 Claims, No Drawings

2-ETHYLHEXYL METHYL TEREPHTHALATE AND BIS(2-ETHYLHEXYL) TEREPHTHALATE BLEND PLASTICIZERS

CROSS-REFERENCE TO RELATED APPLICATION(S)

This application is a national stage filing under 35 USC § 371 of International Application Number PCT/US2021/041352, filed on, Jul. 13, 2021 which claims the benefit of the filing date to U.S. Provisional Application No. 62/705,927, filed on Jul. 23, 2020, the entire disclosures of which are incorporated by reference herein.

FIELD OF THE INVENTION

This invention pertains to plasticizers and more particularly to di-(2-ethylhexyl) terephthalate (DOTP) and 2-ethylhexyl methyl terephthalate (MOTP) mixtures and their use as plasticizers.

BACKGROUND OF THE INVENTION

Ortho-phthalates (1,2-benzenedicarboxylate esters) are materials that have been historically used as additives to plastic materials to make the plastic softer and more flexible. Some ortho-phthalates have been associated with health concerns depending on their specific chemical structure. Diisononyl phthalate (DINP) is a commonly used plasticizer, however non-ortho-phthalate alternatives to DINP have been sought by plastic manufacturers due to human health concerns. Di-(2-ethylhexyl) terephthalate, also known as dioctyl terephthalate or DOTP, is used as a plasticizer in a variety of polymeric materials. Terephthalates are 1,4-benzenedicarboxylate esters and are toxicologically more benign than ortho-phthalates. DOTP is considered an alternative plasticizer to diisononyl phthalate (DINP). DOTP is available commercially from Eastman Chemical Company as EASTMAN 168™. EASTMAN 168™ has greater than 97 weight percent DOTP and less than 3 weight percent of 2-ethylhexyl methyl terephthalate (MOTP) percent as a trace component produced from the manufacturing process.

DOTP's performance is not always sufficient in many flexible polymers such as polyvinyl chloride (PVC) to replace DINP. A need exists for a unique non-ortho-phthalate plasticizer that can be used in materials such as polyvinyl chloride to replace DINP.

The inventors have discovered that a novel alternative to DINP is a blend of di-(2-ethylhexyl) terephthalate (DOTP) with greater than 3 weight percent of 2-ethylhexyl methyl terephthalate (MOTP). The MOTP and DOTP plasticizer blend possesses a better performance profile than commercially available DOTP and is a viable alternative to DINP.

BRIEF SUMMARY OF THE INVENTION

In one embodiment the invention is a plasticizer comprising less than 97 weight percent of di-(2-ethylhexyl) terephthalate and greater than about 3 weight percent 2-ethylhexyl methyl terephthalate wherein the total weight percent of di-(2-ethylhexyl) terephthalate and 2-ethylhexyl methyl terephthalate equals 100 weight percent.

In another embodiment, the invention is a plasticizer comprising about 4 to 60 weight % 2-ethylhexyl methyl terephthalate and about 96 to 40 weight % di-(2-ethylhexyl) terephthalate wherein the total weight percent of di-(2-ethylhexyl) terephthalate and 2-ethylhexyl methyl terephthalate equals 100 weight percent.

In another embodiment, the invention is a plasticizer comprising about 20 to 25 weight % 2-ethylhexyl methyl terephthalate and about 80 to 75 weight % di-(2-ethylhexyl) terephthalate wherein the total weight percent of di-(2-ethylhexyl) terephthalate and 2-ethylhexyl methyl terephthalate equals 100 weight percent.

In another embodiment, the invention is a composition comprising one or more liquid plasticizers in combination with a PVC resin and other standard formulation additives, wherein the plasticizer composition is:

a) a plasticizer comprising 20 to 25 weight % 2-ethylhexyl methyl terephthalate and 80 to 75 weight % di-(2-ethylhexyl) terephthalate, wherein the total weight percent of di-(2-ethylhexyl) terephthalate and 2-ethylhexyl methyl terephthalate equals 100 weight percent; and b) optionally one or more compounds selected from the group consisting of dioctyl phthalate, di-2-ethylhexyl phthalate, diisononyl phthalate, di-butyl terephthalate, di-isobutyl terephthalate, dioctyl terephthalate, diisodecyl phthalate, diundecyl phthalate, trioctyl trimellitate, diisononyl cyclohexyl dicarboxylate, epoxidized soya/tall oil, epoxidized linseed oil, pentaerythritol tetravalerate, dioctyl adipate, polymers that are formed by the polymerization of glycols with one or more of adipic acid, phthalic acid, and sebacic acid, triethyl citrate, acetyl triethyl citrate, tri-n-butyl citrate, acetyl tri-n-butyl citrate, benzoate esters obtained by the reaction of benzoic acid and linear/branched alkyl residues in the range of $C_7$-$C_{12}$, dibenzoate esters of $C_2$-$C_8$ linear/branched glycols/diols.

DETAILED DESCRIPTION

Definitions

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms “having,” “has,” and “have” have the same open-ended meaning as “comprising,” “comprises,” and “comprise” provided above.

As used herein, the terms “including,” “includes,” and “include” have the same open-ended meaning as “comprising,” “comprises,” and “comprise” provided above.

“Chosen from” as used herein can be used with “or” or “and.” For example, Y is chosen from A, B, and C means Y can be individually A, B, or C. Alternatively, Y is chosen from A, B, or C means Y can be individually A, B, or C; or a combination of A and B, A and C, B and C, or A, B, and C.

“Fast fusing plasticizer” as used herein is defined as follows. For most applications, the plasticizer reference standard is di-2-ethylhexyl phthalate (DEHP) as this plasticizer has been the most widely used plasticizer since it was commercialized in the late 1930’s. Plasticizers which fuse at lower temperatures than that required for DEHP, at the same concentration in a given polymer system, are considered “fast fusing plasticizers”. Likewise, plasticizers that fuse at higher temperatures than that required for DEHP, at the same concentration in a given polymer system, are considered “slow fusing” plasticizers.

Invention

The existing non-phthalate plasticizer options (DOTP, DINCH) provide adequate, but not exceptional, plasticizer performance in blends with PVC. Some processes that use orthophthalate plasticizer, that are required to switch to a non-orthophthalate plasticizer for regulatory reasons, generally must modify their production process to accommodate the reduced performance of the non-orthophthalate alternative plasticizers. In such production processes, a fast-fusing plasticizer can often be added to the formulation to achieve desired performance, resulting in increased formulation cost. Performance measurables in a typical PVC process include fusion temperature, gelation point, plastisol viscosity, efficiency, plasticizer compatibility, and drying time. Compared to existing non-orthophthalate plasticizers this invention yields desirable lower fusion temperatures and gel points, lower plastisol viscosity, higher efficiency, better plasticizer compatibility, and shorter dry times.

The plasticizer invention disclosed herein is the reaction product of dimethyl terephthalate (DMT) and 2-ethylhexanol as shown in the reaction below.

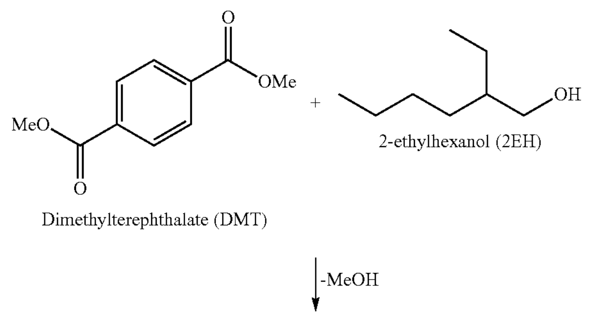

Dimethylterephthalate (DMT) + 2-ethylhexanol (2EH)

-continued

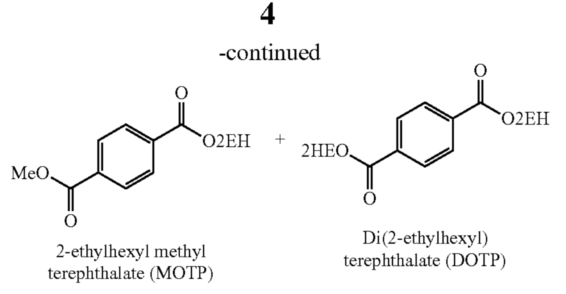

2-ethylhexyl methyl terephthalate (MOTP) + Di(2-ethylhexyl) terephthalate (DOTP)

The reaction is not allowed to go to completion. Instead, the reaction is stopped when there is approximately 20% of the mono-ester contained in the final product. The mono-ester, 2-ethylhexyl methyl terephthalate (MOTP) and DOTP, in a MOTP rich blend, is a better plasticizer then the diester, DOTP when used alone or with only small amounts (ie <about 3 weight percent) of MOTP present in the plasticizer blend.

There is a direct correlation between plasticizer performance and the level of MOTP in the product. As such, the useful range of MOTP in the MOTP/DOTP plasticizer blend is expected to fall within a range of about 3 to about 60 weight % MOTP and about 97 to about 40 weight % DOTP. The optimal range of MOTP in the MOTP/DOTP plasticizer blend is about 20 to about 25 weight % MOTP and about 80 to about 75 weight % DOTP.

This plasticizer blend is expected to have utility in a broad range of PVC dispersion, suspension, and blending resins such as resins having a molecular weight defined by a range of K values comprising K=approximately 60 to 84, and resin particle sizes ranging from about 0.5 microns to 5 microns. The plasticizer blend is also expected to have utility for use in PVC resins where up to 10% of the ethylene chloride content of the PVC resins is replaced with vinyl acetate or $C_1$-$C_3$ acrylates.

Hydrogenation of a terephthalate ester induces chirality in the resulting cyclohexane dicarboxylate product. If the alkyl chains of terephthalate ester are greater than two carbons long, the resulting cis/trans ratio in the cyclohexane dicarboxylate product is approximately 45:55. It is known in the art that the cis isomer of the cyclohexane dicarboxylate ester has slightly better performance, from a plasticizer perspective, than the trans ester. It is also known in the art that 1,4-disubstituted cyclohexane dicarboxylate esters have better UV stability than their 1,4-disubstituted benzene dicarboxylate ester analogs. The UV degradation performance aspect of the hydrogenated invention was tested and, while it did perform better than both the general-purpose plasticizer DOTP, and the invention, its improved performance was not significant enough to warrant further investigation. It should be noted that the hydrogenated version of the invention does not provide significant performance improvements with respect to gel point or fusion temperature. It is also important to point out that hydrogenated analog of MOTP is fairly volatile, which may not be a desirable attribute in a PVC plasticizer. As such, blending the hydrogenated material with other plasticizers, and other standard PVC formulation components, would be a reasonable way to achieve desired performance.

EXAMPLES

This invention can be further illustrated by the following examples thereof, although it will be understood that these examples are included merely for purposes of illustration and are not intended to limit the scope of the invention unless otherwise specifically indicated.

Abbreviations mL is milliliter; wt % is weight percent; eq is equivalent (s); hrs or h is hour(s); mm is millimeter; m is meter; GC is gas chromatography; ° C. is degree Celsius; ° F. is degree Fahrenheit; rt is room temperature; min is minute; tR is retention time; g is gram; mmol is millimole; mol is mole; kg is kilogram; L is liter; w/v is weight/volume; μL is microliter; Tg is glass transition temperature; MW is molecular weight; and Phr is "Parts per Hundred Resin".

General Synthetic Procedure 2-ethylhexan-1-ol (820.5 g, 6.3 mol), dimethyl terephthalate (582.6 g, 3 mole), and tetraisopropyl titanate (0.27, 200 ppm) were combined in a round bottom flask equipped with a Dean-Stark apparatus. The reaction mixture was heated to 170° C. to remove methanol. When the appropriate amount of methanol was recovered, the reaction was sampled for % MOTP (20.22%). The reaction was held for 30 minutes and re-sampled for % MOTP (21.14%). The resulting crude product was treated with 2.5% aq. NaOH, and the mixture was heated at 90° C. (30 min). The aqueous layer was separated, and the organic layer was treated with water (300 g) and the mixture was heated at 90° C. (30 min). The crude organic layer still contained excessive residual DMT (>1.0%). A second caustic wash was performed and the residual DMT dropped to 0.04%. The organic layer was separated, and the organic was filtered through diatomaceous earth. The organic layer was then concentrated in vacuo (~3 mmHg) for 20 minutes. Then the material was treated with activated carbon (0.5 g) and stirred at 90° C. (30 min), and the mixture was filtered through diatomaceous earth to provide a product with 24.55 weight % MOTP and 75.45 weight % DOTP.

The plastisols were prepared by combining the components of the formulation, shown in Table 1, into an appropriate Flack Tek mixing container. Each sample was agitated using a Flack Tek DAC 600.2 VAC Speed Mixer™ operated at 1600 rpm for 40 sec intervals. Temperature was monitored between mixing intervals to ensure the temperature did not rise above 95° F. Once samples were thoroughly mixed to a smooth consistency, they were then deaerated for 5 minutes under vacuum (~75 Torr) at 1000 rpm. Once produced the plastisols are subjected to several analytical evaluations to assess viscosity, gel point, and fusion temperature. The plastisols can then fused at varying temperatures to create PVC films and parts for subsequent testing.

TABLE 1

Standard Plastisol Formulation Used for Studies.

| Component | Phr |
|---|---|
| Plasticizer | 60 |
| Geon 121A (PVC Homopolymer Dispersion Resin) | 100 |
| Drapex 6.8 (Epoxidized Soya Oil) | 3 |
| Akcrostab LT-4798 (stabilizer) | 3 |

Plastisol viscosity is measured using a parallel plate rheometer. A shear sweep is run from 0.1-100 $sec^{-1}$ at 25° C. The sample gap is set to 500 microns. The plastisol viscosities are measured at two different time intervals: 24 and 168 hours. The viscosity observed at 10 $sec^{-1}$ closely correlates to the viscosity obtained via Brookfield viscometry at 10 RPM. Results are shown in Table 2 below. The invention shows a significant reduction in viscosity compared to DINP and also has lower viscosity than Eastman 168™.

TABLE 2

Plastisol Viscosity viscosities at 10 $sec^{-1}$ (Pascal-seconds)

| | 24 hour | 168 hour |
|---|---|---|
| DINP | 2.90466 | 3.07969 |
| Eastman 168 ™ | 2.65963 | 2.6487 |
| 20% MOTP | 2.4791 | 2.61793 |

Gel Point

Fusion results were determined using a Parallel Plate Rheometer and adapting ASTM D2538. Samples were analyzed on a TA Instruments DHR-1 parallel plate rheometer, fitted with an Environmental Test Chamber, 25 mm parallel plate geometry, set to a 1000-micron gap. A temperature sweep from 40-150° C. is run in oscillation mode with a heating rate of 5° C./min. On the resulting plots, the temperature where the G'/G" curves cross is taken as an indication of the "gel" point. The temperature at maximum complex viscosity is taken as the fusion temperature. The invention has significantly lower gel point and fusion temperature compared to DINP and Eastman 168™, as shown in Table 3

TABLE 3

Fusion Characteristics

| Plasticizer | Gel Pt (° C.) | Fusion Temp (° C.) |
|---|---|---|
| DINP | 74 | 131 |
| Eastman 168 ™ | 73 | 132 |
| 20% MOTP | 67 | 120 |

Efficiency

Efficiency is the degree to which a plasticizer softens a fused PVC part and is defined by a hardness value. The Shore A hardness was determined according to ASTM D2240. Fused parts were prepared using 25 g of plastisol in a circular button mold. The parts are fused at 375° F. for 30 min, removed from the mold, and allowed to equilibrate at rt for 24 h. Hardness was measured on a Rex Durometer. The instrument was calibrated for the expected range of hardness using the appropriate calibration standard. Table 4 below shows the efficiency results. The invention has a lower Shore A hardness value, indicating a greater efficiency compared to DINP and Eastman 168™

TABLE 4

Shore A Hardness

| Plasticizer | Shore A |
|---|---|
| DINP | 72.5 |
| Eastman 168 ™ | 72.8 |
| 20% MOTP | 70.8 |

The dry time of a dry blend formulation is an indication of the plasticizer's compatibility with the PVC resin. Dry time is assessed using ASTM D2396. The dry components are allowed to mix in a torque rheometer bowl for a specified period of time at a given temperature. The plasticizer is then dispersed into the dry components and the change in torque is monitored to determine the dry time. Table 5 below shows the dry time results. The invention has a significantly shorter dry time than both DINP and Eastman 168™.

TABLE 5

| Dry Time | |
|---|---|
| Plasticizer | Dry Time (mins) |
| DOTP | 3.57 |
| DINP | 3.27 |
| 20% MOTP | 2.83 |

Optimal Concentration

The invention's performance is directly correlated to the amount of MOTP present. The commercial Eastman 168™ product contains less than about 3 weight % MOTP. Increasing the amount of MOTP in the invention has several positive aspects: decreasing the gel pt and fusion temperature of a given formulation, reducing the plastisol viscosity, shortening the dry time, and increasing efficiency. However, increasing the level of MOTP also negatively impacts the volatility of the product. Volatility can be an undesirable behavior in a plasticizer depending on the production process. As such, the optimal amount of MOTP will be a balance of positive performance attributes against volatility. The ultimate target of this performance is to meet/exceed that of the current general-purpose phthalate plasticizer, DINP. So, the desired weight percent MOTP will be that ratio that provides performance equivalent to or exceeding DINP. Table 6 below shows the impact of increasing level of MOTP on volatility, as measured by EPA Method 24. EPA method 24 is a gravimetric analysis where the sample is held at 110° C. for one hour.

TABLE 6

| Method 24 Volatility | |
|---|---|
| VOC (wt %) | EPA 24 |
| DINP | 0.18 |
| 168 | 0.35 |
| 10% MOTP | 0.69 |
| 20% MOTP | 0.91 |
| 40% MOTP | 1.52 |
| 60% MOTP | 2.11 |

A series of samples were prepared with increasing amounts of MOTP. The plastisols were tested for fusion characteristics to determine the impact of MOTP concentration on gel point and fusion temperature. When plotted, the data suggests a linear correlation between both gel point, fusion temperature, and MOTP concentration. As the desire was to generate a product that just exceeds the performance of DINP, the MOTP loading of approximately 20% appears to be a good target, providing enhanced plasticizer performance, without a significant increase in volatility. Table 7 below shows the impact of MOTP concentration on fusion characteristics.

TABLE 7

| MOTP impact on fusion characteristics | | |
|---|---|---|
| Wt % MOTP | Gel Pt (C.) | Fusion Temp (C.) |
| 2.33 | 76 | 133 |
| 10 | 75 | 130 |
| 20 | 71 | 125 |
| 40 | 68 | 120 |
| 60 | 65 | 114 |

With respect to plastisol viscosity, increasing the level of MOTP will lower the viscosity but, based on the fusion results, there is little value in going beyond 20%. Again, the best balance between fusion performance, viscosity reduction, and volatility, seems to be in the 20% MOTP range. Table 8 shows impact of MOTP concentration on viscosity

TABLE 8

| Viscosity vs. % MOTP Viscosity at 10 $sec^{-1}$ | | |
|---|---|---|
| Wt % MOTP | 24 h | 168 h |
| 10 | 2.5584 | 2.64769 |
| 20 | 2.4791 | 2.61793 |
| 40 | 2.4106 | 2.5547 |
| 60 | 2.26957 | 2.46853 |
| DOTP (2.33% MOTP) | 2.65963 | 2.6487 |
| DINP | 2.90466 | 3.07969 |

Exudation testing was performed via ASTM D3291. Plastisol films were fused using a Mathis oven at 375° F. for 15 minutes. The films were allowed to equilibrate for 24 hours, at ambient conditions, prior to being cut into 1"×1.5" strips. Twelve strips were cut for each formulation, four used for each time interval. The level of spew is semi-quantitatively assessed on a scale of 1-3, with three being the worst. The average was taken, and the results are shown in Tables 9/10/11. The 20% MOTP product shows the best compatibility in the range of wt %'s.

TABLE 9

| 4-hour loop spew | | | | |
|---|---|---|---|---|
| CTRL | 10% MOTP | 20% MOTP | 40% MOTP | 60% MOTP |
| 2 | 2 | 1 | 1 | 2 |
| 2 | 2 | 1 | 1 | 2 |
| 2 | 2 | 1 | 1 | 2 |
| 3 | 2 | 1 | 1 | 2 |
| 2.25 | 2 | 1 | 1 | 2 |

TABLE 10

| 24-hour loop spew | | | | |
|---|---|---|---|---|
| CTRL | 10% MOTP | 20% MOTP | 40% MOTP | 60% MOTP |
| 3 | 3 | 2 | 2 | 3 |
| 3 | 3 | 2 | 2 | 3 |
| 3 | 3 | 2 | 3 | 3 |
| 3 | 3 | 2 | 3 | 3 |
| 3 | 3 | 2 | 2.5 | 3 |

TABLE 11

| 7-day loop spew | | | | |
|---|---|---|---|---|
| CTRL | 10% MOTP | 20% MOTP | 40% MOTP | 60% MOTP |
| 3 | 3 | 1 | 1 | 3 |
| 3 | 3 | 1 | 1 | 3 |
| 3 | 3 | 0 | 1 | 3 |
| 3 | 3 | 0 | 1 | 3 |
| 3 | 3 | 0.5 | 1 | 3 |

As disclosed above, the MOTP and DOTP plasticizer blend possesses a better performance profile than commercially available DOTP and is a viable alternative to DINP.

In the specification, there have been disclosed certain embodiments of the invention and, although specific terms are employed, they are used in a generic and descriptive sense only and not for purposes of limitation, the scope of the invention being set forth in the following claims.

We claim:

1. A composition comprising:

A) a PVC resin; and

B) a plasticizer blend comprising:

a) 20 to 25 weight % 2-ethylhexyl methyl terephthalate and 80 to 75 weight % di-(2-ethylhexyl) terephthalate wherein the total weight percent of di-(2-ethylhexyl) terephthalate and 2-ethylhexyl methyl terephthalate equals 100 weight percent; and b) optionally one or more compounds selected from the group consisting of dioctyl phthalate, di-2-ethylhexyl phthalate, diisononyl phthalate, di-butyl terephthalate, di-isobutyl terephthalate, dioctyl terephthalate, diisodecyl phthalate, diundecyl phthalate, trioctyl trimellitate, diisononyl cyclohexyl dicarboxylate, epoxidized soya/tall oil, epoxidized linseed oil, pentaerythritol tetravalerate, dioctyl adipate, polymers that are formed by the polymerization of glycols with one or more of adipic acid, phthalic acid, and sebacic acid, triethyl citrate, acetyl triethyl citrate, tri-n-butyl citrate, acetyl tri-n-butyl citrate, benzoate esters obtained by the reaction of benzoic acid and linear/branched alkyl residues in a range of $C_7$-$C_{12}$, dibenzoate esters of $C_2$-$C_8$ linear/branched glycols/diols.

2. The composition of claim 1, wherein the plasticizer is present in the amount of 5-500 parts per hundred (Phr) resin.

3. The composition of claim 1 wherein said PVC resin has a molecular weight defined by a range of K values comprising K=approximately 60 to 84, and b) a resin particle size range from about 0.5 microns to 5 microns.

4. The composition of claim 1, wherein said PVC resin has up to 10% ethylene chloride content replaced with vinyl acetate or $C_1$-$C_3$ acrylates.

* * * * *